United States Patent [19]
Kim

[11] Patent Number: 5,982,975
[45] Date of Patent: Nov. 9, 1999

[54] VIDEO SIGNAL COPYING APPARATUS

[75] Inventor: Sang-wook Kim, Suwon, Rep. of Korea

[73] Assignee: Samsung Electronics Co., Ltd., Kyungki-do, Rep. of Korea

[21] Appl. No.: 08/883,700

[22] Filed: Jun. 27, 1997

[30] Foreign Application Priority Data

Jun. 28, 1996 [KR] Rep. of Korea ................. 96-25212

[51] Int. Cl.⁶ ........................................................ H04N 9/70
[52] U.S. Cl. ............................. 386/11; 348/643; 348/644; 386/44; 386/1
[58] Field of Search ........................ 386/9, 11, 19, 386/44, 84, 94, 93, 1; 360/65; 348/624, 643, 644, 607, 642; H04N 9/70

[56] References Cited

U.S. PATENT DOCUMENTS

| | | | |
|---|---|---|---|
| 3,945,033 | 3/1976 | Tanihara et al. | 358/26 |
| 3,975,759 | 8/1976 | Taniguchi et al. | 358/4 |
| 4,068,256 | 1/1978 | Tsuchiya et al. | 358/4 |
| 4,510,530 | 4/1985 | Miura et al. | 358/314 |
| 4,691,247 | 9/1987 | Honjo et al. | |
| 5,032,925 | 7/1991 | Ganse et al. | 358/310 |
| 5,194,963 | 3/1993 | Dunlap et al. | 358/314 |
| 5,212,561 | 5/1993 | Kim | 358/317 |
| 5,245,439 | 9/1993 | Kim | |
| 5,389,979 | 2/1995 | Jeong | 348/644 |
| 5,416,649 | 5/1995 | McSweeney et al. | 360/77.13 |

Primary Examiner—Thai Tran
Assistant Examiner—Vincent F. Boccio
Attorney, Agent, or Firm—Sughrue, Mion Zinn Macpeak & Seas, PLLC

[57] ABSTRACT

A video signal copying apparatus for copying a signal recorded on a recording medium onto other recording media is provided. The video signal copying apparatus includes a first filter for blocking a color signal and passing a luminance signal of a video signal detected from a video signal recording medium, a second filter for passing only the color signal of the video signal, a burst detection signal generator for generating a burst detection signal for detecting a burst signal, a color signal determiner for generating a color killer signal when a color signal does not exist in the video signal, a peak level detector for detecting the peak level of the input signal over all frequency bands when the color killer signal is generated, or over only a burst detection signal section when the color killer signal is not generated, by receiving the filtered color signal, a voltage-controlled amplifier for automatically controlling the gain of the color signal in correspondence to the detected peak level, and a mixer for mixing the filtered luminance signal and the gain-controlled color signal to output a video signal to be recorded via a recording amplifier. Therefore, loss of a luminance signal which is part of a low-frequency component can be prevented when copying a black and white signal, thereby improving picture quality.

10 Claims, 4 Drawing Sheets

REPRODUCED COMPOSITE VIDEO SIGNAL

SYNCHRONOUS SIGNAL

BURST GATE SIGNAL

COLOR SIGNAL

SEPARATED BURST SIGNAL

CONTROL VOLTAGE FOR HOLDING PEAK VALUE OF BURST SIGNAL

VIDEO SIGNAL COPYING APPARATUS

BACKGROUND OF THE INVENTION

The present invention relates to a video signal processing apparatus, and more particularly, to a video signal copying apparatus for copying a signal which has been recorded on a recording medium onto other recording media.

Generally, a video signal recorded on a video tape can be copied onto other video tapes using two video tape recorders or a dual-deck recorder.

According to a first method using two video tape recorders, one video tape recorder picks up a signal to be copied from a tape, and then outputs a demodulated signal via a general reproducing process such as demodulation. Also, the other video tape recorder receives the demodulated video signal and then records the video signal on a tape via a recording amplifier after performing a general recording process such as modulation.

According to a second method using a dual-deck recorder, a signal to be copied is picked up from a tape by a signal processing unit of a first deck and then a modulated signal is recorded on another tape by a signal processing block of a second deck directly without demodulation.

In the above second method, the signal modulation is omitted during the tape copy process compared to the first method, and the modulated signal picked up by a reproducing deck player is directly recorded on a tape by a recording deck recorder. Accordingly, the signal-to-noise (S/N) ratio is improved.

FIG. 2 is a block diagram showing the structure of a conventional video signal copying apparatus, illustrating an example of the video signal copy technology related to the above second method.

The prior art will be described with reference to FIG. 2.

The conventional video signal copying apparatus includes a luminance processor composed of a high-pass filter (HPF) 2010, a phase compensator 2020, an equalizer 2030 and a limiter 2040, a color processor composed of a low-pass filter (LPF) 2100, a voltage-controlled amplifier 2110 and a switching unit 2120, an automatic color gain controller composed of a demodulator 2050, a synchronous signal separator 2060, a burst gate signal generator 2070, a color signal determiner 2080 and a peak level detector 2090, and a mixer 2130 for mixing the processed luminance and color signals.

In a color signal process, an automatic color gain control (ACC) circuit is used to control the degree of color saturation, maintaining a color level at a predetermined level.

The ACC circuit separates only a burst signal from an input color signal and then detects the level thereof to thereby maintain a constant level, so that the gain of the color signal is controlled to a predetermined level.

The ACC circuit performing the above operation normally operates even when a black and white signal is input. The ACC circuit amplifies a black and white signal corresponding to a frequency band of a color signal to the maximum gain, resulting in a saturated signal.

When the black and white signal is input as above, a color signal determiner 2080 for determining whether a color signal exists or not outputs a color killer signal to a switching unit 2120 to prevent the output of the signal ("color band signal") corresponding to the frequency band of the color signal after the color band signal is amplified to the maximum gain.

When a black and white signal is input, the conventional ACC circuit amplifies the color band signal to the maximum level and then blocks the output thereof. As a result, a luminance signal corresponding to the frequency band of the color signal is also prevented from being output, so that the frequency band of the luminance signal decreases as shown in FIG. 4C, thereby lowering picture quality.

SUMMARY OF THE INVENTION

To solve the above problem, it is an object of the present invention to provide a video signal copying apparatus capable of improving picture quality even when a black and white signal is recorded.

To achieve the above object, there is provided a video signal copying apparatus comprising: a first filter for blocking a color signal and passing a luminance signal of a video signal detected from a video signal recording medium; a second filter for blocking the luminance signal and passing the color signal of the video signal; a burst detection signal generator for generating a burst detection signal for detecting a burst signal using a demodulated luminance signal; a color signal determiner for generating a color killer signal by receiving the burst detection signal when a color signal does not exist in the video signal; a peak level detector for detecting the peak level of the input signal over all frequency bands when the color killer signal is generated, or over only a burst detection signal section when the color killer signal is not generated, by receiving the color signal; a voltage-controlled amplifier for automatically controlling the gain of the color signal in correspondence to the detected peak level to output a gain-controlled color signal; and a mixer for mixing the luminance signal and the gain-controlled color signal to output a video signal to be recorded.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
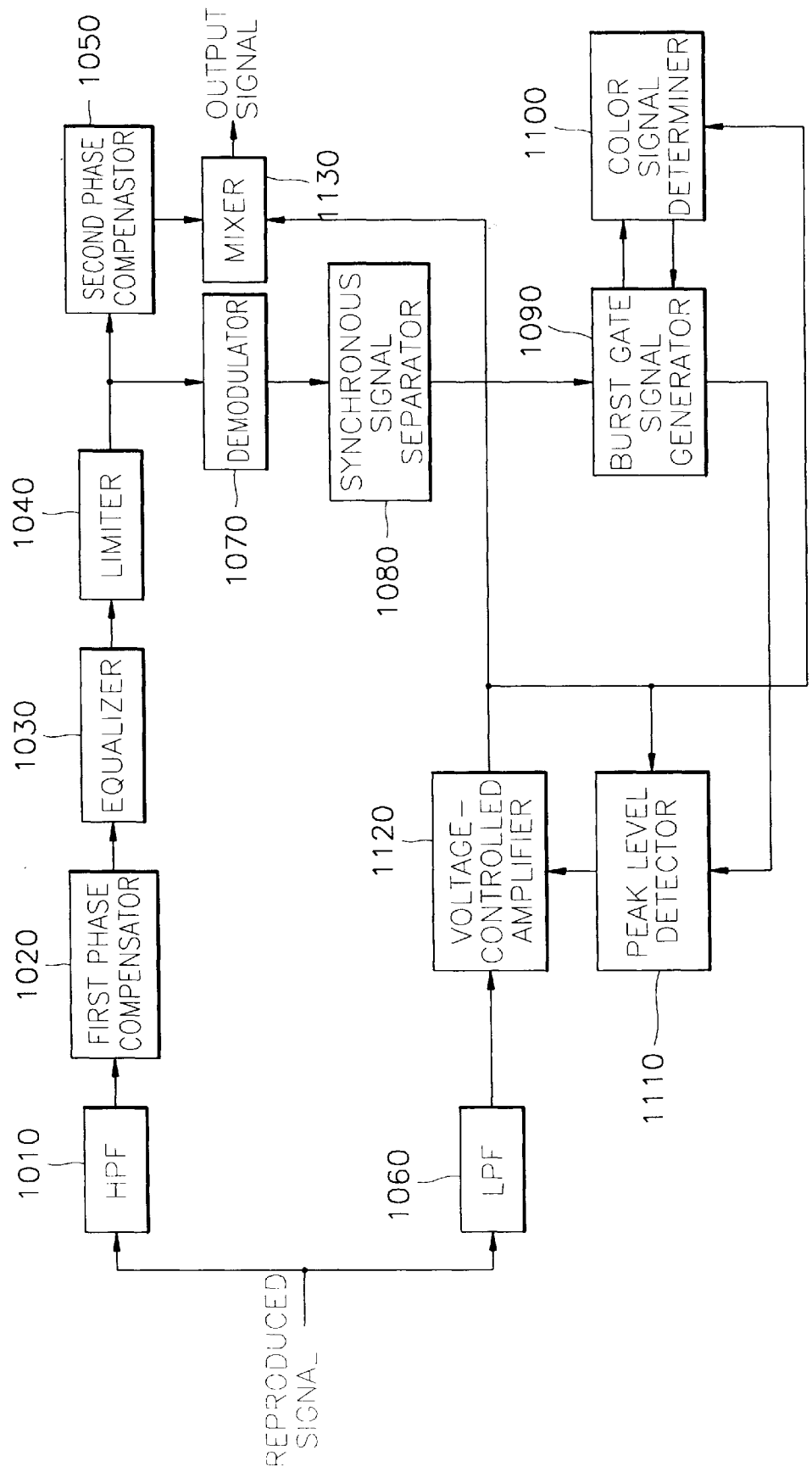
FIG. 1 is a block diagram showing the structure of a video signal copying apparatus according to the present invention.
Figure 2:
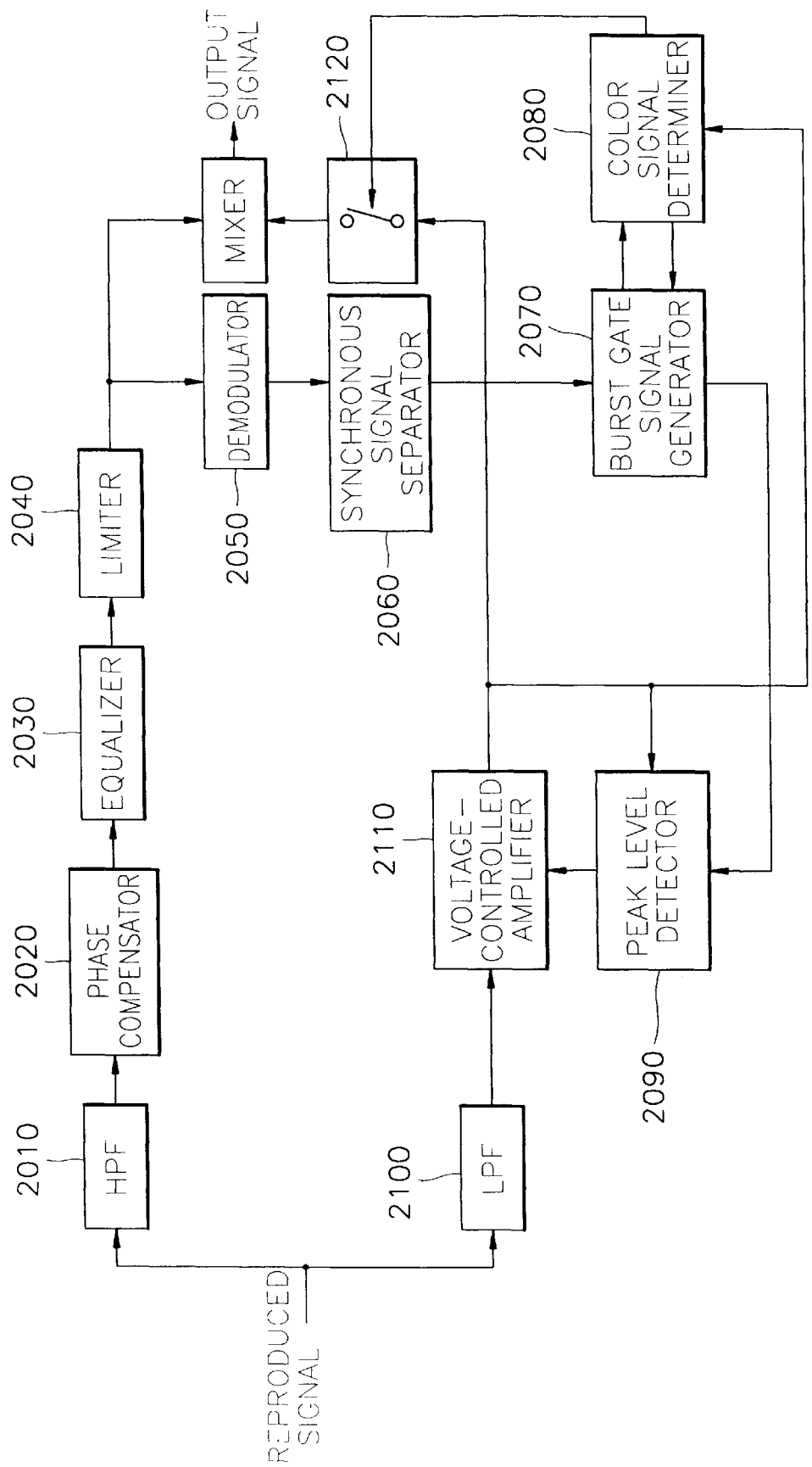
FIG. 2 is a block diagram showing the structure of a conventional video signal copying apparatus.

As shown in FIG. 1, a video signal copying apparatus according to the present invention comprises a high-pass filter (HPF) 1010 for passing only a high-band signal of input video signals, a first phase compensator 1020 for compensating for the phase difference of a reproduced luminance signal, an equalizer 1030 for adjusting the frequency characteristics of the input signal, a limiter 1040 for limiting the level of the input signal to a predetermined level, a second phase compensator 1050 for compensating for the difference in the phase and delay time of the luminance signal and a color signal, a low-pass filter (LPF) 1060 for passing only a low-band signal of the input video signals, a demodulator 1070 for demodulating the limited luminance signal, a synchronous signal separator 1080 for separating only the synchronous signal from the demodulated luminance signal, a burst gate signal generator 1090 for generating a gating pulse for extracting the burst signal, a color signal determiner 1100 for generating a color killer signal when a color signal does not exist, a peak level detector 1110 for detecting a peak value of the burst signal or color signal depending on whether the color killer signal exists or not, a voltage-controlled amplifier 1120 for amplifying the input signal to a predetermined level, and a mixer 1130 for mixing the luminance signal and the color signal.

Figure 4A:
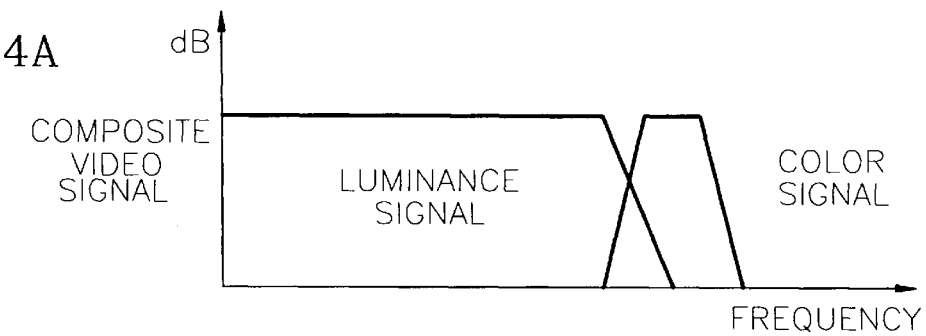
FIGS. 4A through 4D are diagrams showing the frequency characteristics of the major signals of FIGS. 1 and 2.

In a VTR of a preferred embodiment of the present invention, a composite video signal which is demodulated prior to being output includes a luminance signal at a predetermined low frequency band and a color signal at a high frequency band, as shown in FIG. 4A.

Here, the luminance signal and the color signal of the composite video signal are modulated by a high-frequency modulation and a low-frequency modulation, respectively, and then the two signals are mixed to be recorded on a video tape.

Figure 4B:
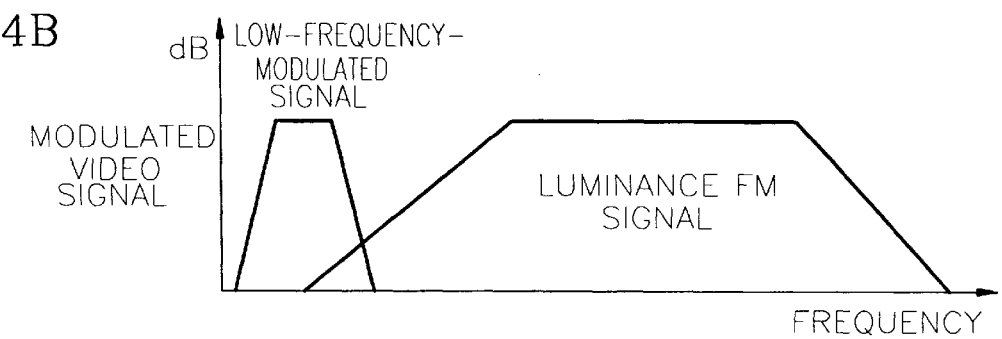

In order to reproduce the video signal recorded on the video tape using the above modulation method, the recorded signal is picked up by a video head. Then, the picked-up video signal includes the high-frequency-modulated luminance signal and the low-frequency-modulated color signal as shown in FIG. 4B.

Here, since the picked-up luminance signal and color signal are modulated by different methods, the signals are reproduced and recorded via different signal processes.

In order to separate the luminance signal and the color signal from the video signal picked up by the video head, the HPF 1010 and the LPF 1060 are utilized.

The HPF 1010 blocks the low-frequency-modulated color signal from the picked-up video signal and passes only the luminance signal.

Also, the LPF 1060 passes only the low-frequency-modulated color signal of the picked-up video signal and blocks the luminance signal.

In another embodiment, the LPF 1060 may be set to have the same characteristics as those of a band-pass filter (BPF).

The first phase compensator 1020 receives the luminance signal which has passed through the HPF 1010 and compensates for the difference in the delay time and phase of the luminance signal and color signal which are separated by the HPF and the LPF.

The equalizer 1030 receives the phase-compensated signal to adjust the attenuation characteristics at a high frequency band caused by the characteristics of the video head, and the group delay characteristics occurring in the pickup process.

The limiter 1040 receives the output signal of the equalizer 1030 to prevent loss of a frequency component having small amplitude during the signal processing, thereby improving the reversion between black and white during reproduction.

The second phase compensator 1050 compensates for the difference in delay time and phase between the high-frequency-modulated luminance signal and the low-frequency-modulated color signal during the recording process.

Also, in order to generate a burst detection signal, the demodulator 1070, the synchronous signal separator 1080 and the burst gate signal generator 1090 are utilized.

The demodulator 1070 receives the output from the limiter 1040 to demodulate the frequency-modulated luminance signal.

Figure 3A:
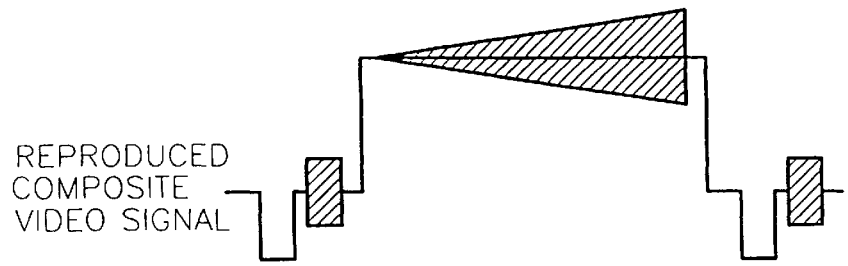
FIGS. 3A through 3F are waveforms of major signals at the respective blocks shown in FIG. 1.
Figure 3B:

The synchronous signal separator 1080 receives the demodulated luminance signal to separate only a synchronous signal as shown in FIG. 3B.

Figure 3C:

The burst gate signal generator 1090 receives the synchronous signal separated from the luminance signal, and delays the synchronous signal for a predetermined duration and controls the pulse width thereof, thereby generating a burst gate signal (see FIG. 3C) capable of extracting a burst signal.

The color signal determiner 1100 applies a color killer signal to the burst gate signal generator 1090 if it is determined that the input signal is a black and white signal.

The burst gate signal generator 1090 outputs an all-pass gate signal more than a predetermined level to the peak level detector 1110 to detect the peak level of the input signal over all frequency bands when the color killer signal is applied.

The color signal determiner 1100 receives the color signal output from the voltage-controlled amplifier 1120 to determine whether a burst signal exists within a burst gate signal section, and outputs a color killer signal if the burst signal does not exist.

Figure 3D:
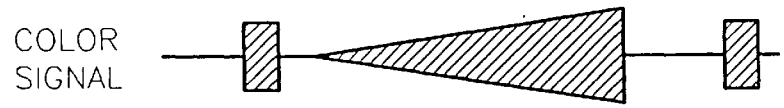
Figure 3E:
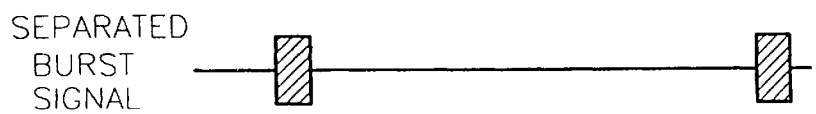
Figure 3F:
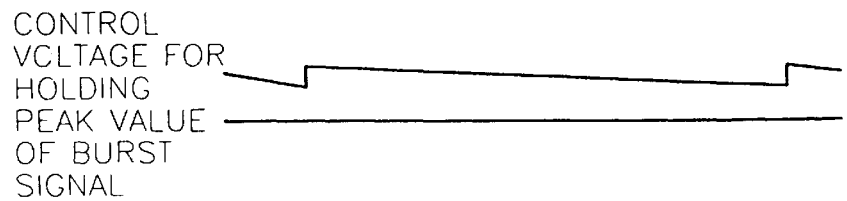

The peak level detector 1110 receives the color signal (see FIG. 3D) output from the voltage-controlled amplifier 1120 to separate only the burst signal (see FIG. 3E) from the burst gate section if only a burst gate signal is applied. Then, the peak level detector 1110 detects a peak value and holds the peak value to output a signal having the waveform of FIG. 3F to the voltage-controlled amplifier 1120.

However, if the all-pass gate signal is applied to the peak level detector 1110, a peak level of the input color signal is detected over all bands of the input color signal by the peak level detector 1110 and then the detected peak level is output to the voltage-controlled amplifier 1120.

Thus, if a color signal exists in a video signal picked up by the video head, the voltage-controlled amplifier 1120 amplifies the color signal to a predetermined level using a burst signal.

However, if a color signal does not exist in the video signal picked up by the video head, the voltage-controlled amplifier 1120 detects the maximum value of the luminance signal existing in the color signal frequency band and amplifies a low-frequency luminance signal existing in the color frequency band to a predetermined level.

The mixer 1130 mixes the signal output from the second phase compensator 1050 and the color signal output from the voltage-controlled amplifier 1120. The output mixed signal is recorded on a video tape by the video head via a recording amplifier (not shown).

Figure 4C:
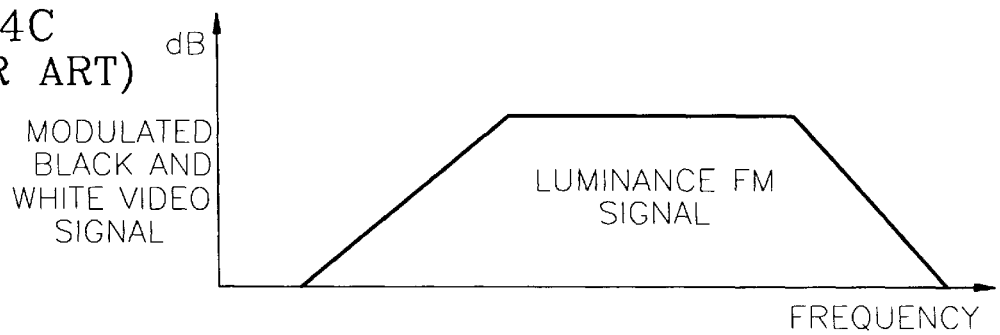
Figure 4D:
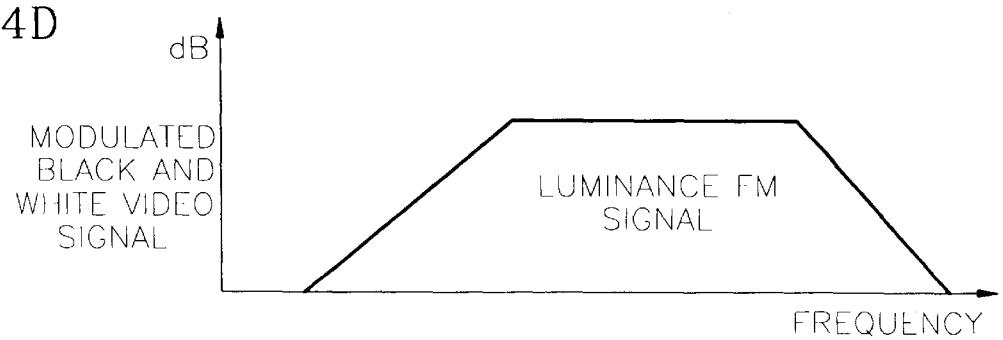

When a black and white signal is reproduced from a tape, the luminance signal output from a conventional video signal copying apparatus has attenuation characteristics at the low-frequency luminance signal band as shown in FIG. 4C. However, the video signal copying apparatus of the present invention normally reproduces the luminance signal at the low-frequency color signal band as shown in FIG. 4D.

According to the present invention described above, even when a black and white signal is reproduced, the luminance signal in a color signal band is properly amplified without blocking and then mixed with the luminance signal band, so that loss of a luminance signal including a low-frequency component is prevented when recording the reproduced black and white signal, thereby improving picture quality.

What is claimed is:

1. A video signal copying apparatus comprising:
   a first filter for blocking a color signal and passing a luminance signal of a video signal detected from a video signal recording medium;

a second filter for blocking the luminance signal and passing the color signal of the video signal;

a burst detection signal generator for generating a burst detection signal indicating a burst signal in response to a demodulated luminance signal;

a color signal determiner for generating a color killer signal by receiving the burst detection signal when a color signal does not exist in the video signal;

a peak level detector for detecting a peak level of the video signal over all frequency bands when the color killer signal is generated, and for detecting the peak level of the input signal over only a burst detection signal section of the video signal when the color killer signal is not generated, by receiving the color signal;

a voltage-controlled amplifier for automatically controlling the gain of the color signal in correspondence to the detected peak level to output a gain-controlled color signal; and a mixer for mixing the luminance signal and the gain-controlled color signal to output a video signal to be recorded.

2. A video signal copying apparatus as claimed in claim 1, wherein the first filter has a high-pass filtering characteristic capable of passing only the luminance signal.

3. A video signal copying apparatus as claimed in claim 1, wherein the second filter has a low-pass filtering characteristic capable of passing only the color signal.

4. A video signal copying apparatus as claimed in claim 1, wherein the second filter has a band-pass filtering characteristic capable of passing the color signal.

5. A video signal copying apparatus as claimed in claim 1, further comprising:

an equalizer coupled between the first filter and the mixer, for improving a high-frequency attenuation characteristic and a group delay characteristic.

6. A video signal copying apparatus as claimed in claim 5, further comprising:

a limiter coupled between the equalizer and the mixer, for limiting the level of the signal equalized to a predetermined level after being high-pass filtered, in order to prevent loss of a signal corresponding to a frequency band with small amplitude during demodulation.

7. A video signal copying apparatus as claimed in claim 6, further comprising:

a phase compensator coupled between the limiter and the mixer, for compensating for the difference in delay time and phase of the gain-controlled color signal and the luminance signal.

8. A video signal copying apparatus comprising:

means for separating a color signal and a luminance signal of a video signal;

first detecting means for detecting whether or not a burst signal exists in said color signal and for generating a color killer signal when the burst signal does not exist in said color signal;

second detecting means for detecting a peak level of the video signal over all frequency bands when the color killer signal is generated, and for detecting the peak level of the video signal over only a frequency band corresponding to a burst detection signal when the color killer signal is not generated;

means for controlling the gain of the color signal in response to the peak level of the video signal detected by said second detecting means to output a gain-controlled color signal; and means for mixing the luminance signal and the gain-controlled color signal to produce an output video signal.

9. A video signal copying apparatus as set forth in claim 8, wherein said means for separating a color signal comprises a first filter for blocking the color signal and a second filter for blocking the luminance signal.

10. A video signal copying apparatus as set forth in claim 9, wherein said first detecting means comprises:

a demodulator for demodulating the luminance signal and outputting a demodulated luminance signal;

a burst detection signal generator for generating a burst signal in response to the demodulated luminance signal; and a color signal determiner for receiving a signal output from said second filter, determining whether or not the signal output from said second filter contains the burst signal, and outputting the color killer signal if it is determined that the signal output from said second filter does not contain a color signal because the burst signal does not exist.

* * * * *